United States Patent [19]

Ohishi

[11] Patent Number: 5,444,509

[45] Date of Patent: Aug. 22, 1995

[54] CAMERA SHAKE COMPENSATING CAMERA

[75] Inventor: Sueyuki Ohishi, Tokyo, Japan

[73] Assignee: Nikon Corporation, Tokyo, Japan

[21] Appl. No.: 234,005

[22] Filed: Apr. 28, 1994

[30] Foreign Application Priority Data

May 6, 1993 [JP] Japan .................... 5-105734

[51] Int. Cl.⁶ .................. G03B 17/00; G03B 7/08
[52] U.S. Cl. ......................... 354/202; 354/430
[58] Field of Search ............ 354/202, 430, 195.1

[56] References Cited

U.S. PATENT DOCUMENTS

| | | | |
|---|---|---|---|
| 4,970,540 | 11/1990 | Vasey et al. | 354/202 |
| 5,117,246 | 5/1992 | Takahashi et al. | 354/202 |
| 5,181,056 | 1/1993 | Noguchi et al. | 354/70 |
| 5,192,964 | 3/1993 | Shinohara et al. | 354/202 |
| 5,243,462 | 9/1993 | Kobayashi et al. | 359/557 |
| 5,289,274 | 2/1994 | Kondo | 348/208 |
| 5,296,925 | 3/1994 | Kondo et al. | 348/208 |
| 5,309,190 | 5/1994 | Shinohara et al. | 354/195.1 |

FOREIGN PATENT DOCUMENTS 50-80845 7/1975 Japan .
55-106442 8/1980 Japan .
2296230 12/1990 Japan .

Primary Examiner—Michael L. Gellner
Assistant Examiner—Nicholas J. Tuccillo
Attorney, Agent, or Firm—Oliff & Berridge

[57] ABSTRACT

A camera shake compensating camera compensates for detected results of camera shake and calculates the actual amount of shake occurring in the camera through the differentiated value of the detected result of camera shake and a previously established time delay. This camera is equipped with a camera shake detection device, differentiation circuits, amplifying circuits, adding circuits, a motor driving circuit, a compensating lens, a motor, and photographic lenses. Calculating the amount of camera shake compensation is accomplished by detecting the camera shake with the camera shake detection device and outputting the amount of shake. Then, a first differentiation circuit time-differentiates the amount of camera shake, and a second differentiation circuit time-differentiates the output of the first differentiation circuit. A first amplifying circuit amplifies the output of the first differentiation circuit by A1 times, and a second amplifying circuit amplifies the output of the second differentiation circuit by A2 times. Next, a first adding circuit adds the output of the amplifying circuits, and a second adding circuit adds the output of the camera shake detection device and the output of the first adding circuit. Finally, the motor is driven by the motor driving circuit based on the amount of camera shake compensation.

31 Claims, 6 Drawing Sheets

CAMERA SHAKE COMPENSATING CAMERA

BACKGROUND OF THE INVENTION

1. Field of the Invention

This invention relates to a camera equipped with a camera shake compensation function that detects camera oscillations and is used to suppress the degradation in picture quality arising from the oscillations.

2. Discussion of Related Art

Currently, conventional camera shake compensating cameras are internally equipped with a camera shake detection device to detect the amount of camera oscillations or "shake". The degradation in picture quality caused by the camera shake is suppressed through the movement of a compensating lens according to the detected amount of shake, as disclosed for example in Japanese Patent Publication No. 50-80845. The camera shake detection devices used with this type of camera shake compensating camera typically include an angular velocity sensor and a component that stores the image of the object being photographed at fixed time intervals, with a CCD used to detect the periodic shake of each resultant image.

When using the angular velocity sensor with the camera shake detection device, the angular velocity induced by the shake of the camera is detected, i.e. changes in the voltage value are detected, and the amount of camera shake based upon angular velocity is determined. When using the component that detects the periodic shake of the stored resultant image on the camera shake detection device, the voltage value is changed, and the amount of camera shake based on the condition of the periodic shake is detected.

In either case, the camera's CPU computes the amount necessary to move the compensating lens, based on the amount of shake detected by the camera shake detection device, and, according to the computed amount, activates the driving motor that moves the compensating lens. After the rotating movement of the motor has been transformed to linear motion through gears, the compensating lens is moved in a direction parallel to the plane of the photographic lens. Thus, the camera shake compensation is accomplished.

Because this type of camera shake compensating camera requires a fixed period of time until the camera shake is detected by the camera shake detection device, a time delay occurs between the actual camera shake and the time that the amount of the shake is output from the camera shake detection device. Particularly, when the component that detects the periodic shake of the stored resultant image is used, the time delay is great because the results of the stored image must be compared at different time intervals. Time is also required for the CPU to compute the amount necessary to move the compensating lens based on the amount of camera shake detected by the camera shake detection device. Furthermore, delays also occur by the time the motor is actually activated based on the computed amount of movement and the driving force reaching the compensating lens through the gears.

However, since conventional camera shake compensating cameras move the compensating lens based on the amount of camera shake detected by the camera shake detection device, and do not account for these time delays, they are unable to correctly compensate for the camera shake that has actually occurred.

SUMMARY OF THE INVENTION

Therefore, an object of the present invention is to provide a camera shake compensating camera that compensates for the detected result of the camera shake through the differential value of the detected results of the camera shake and a pre-set time delay and to accurately compensate for the actual camera oscillations occurring in the camera.

This invention relates to a camera shake compensating camera equipped with a camera shake detection mechanism to detect camera shake and a method of compensating for the shake based on the amount of shake detected by the detection mechanism. Specifically, this camera shake compensating camera has a differentiation mechanism that time-differentiates the amount of camera shake detected by the camera shake detection means. The camera also has a calculation mechanism that determines the amount of camera shake compensation based on the previously established time delay and on the output of the differentiation mechanism. A compensation mechanism compensates for the camera shake based on the amount of camera shake compensation found by the calculating mechanism.

Further, in the camera shake compensating camera according to this invention, the differentiation mechanism comprises a primary differentiation mechanism that time-differentiates the output of the camera shake detection mechanism. Additionally, a secondary differentiation mechanism time-differentiates the output of the primary differentiation mechanism.

As will become apparent with the detailed description below, this invention provides highly accurate camera shake compensation corresponding to the actual amount of camera shake without influence by the time delay occurring from the time the camera shake actually occurs until the time the shake is detected and the compensating lens is moved.

DETAILED DESCRIPTION OF PREFERRED EMBODIMENTS

Figure 1:
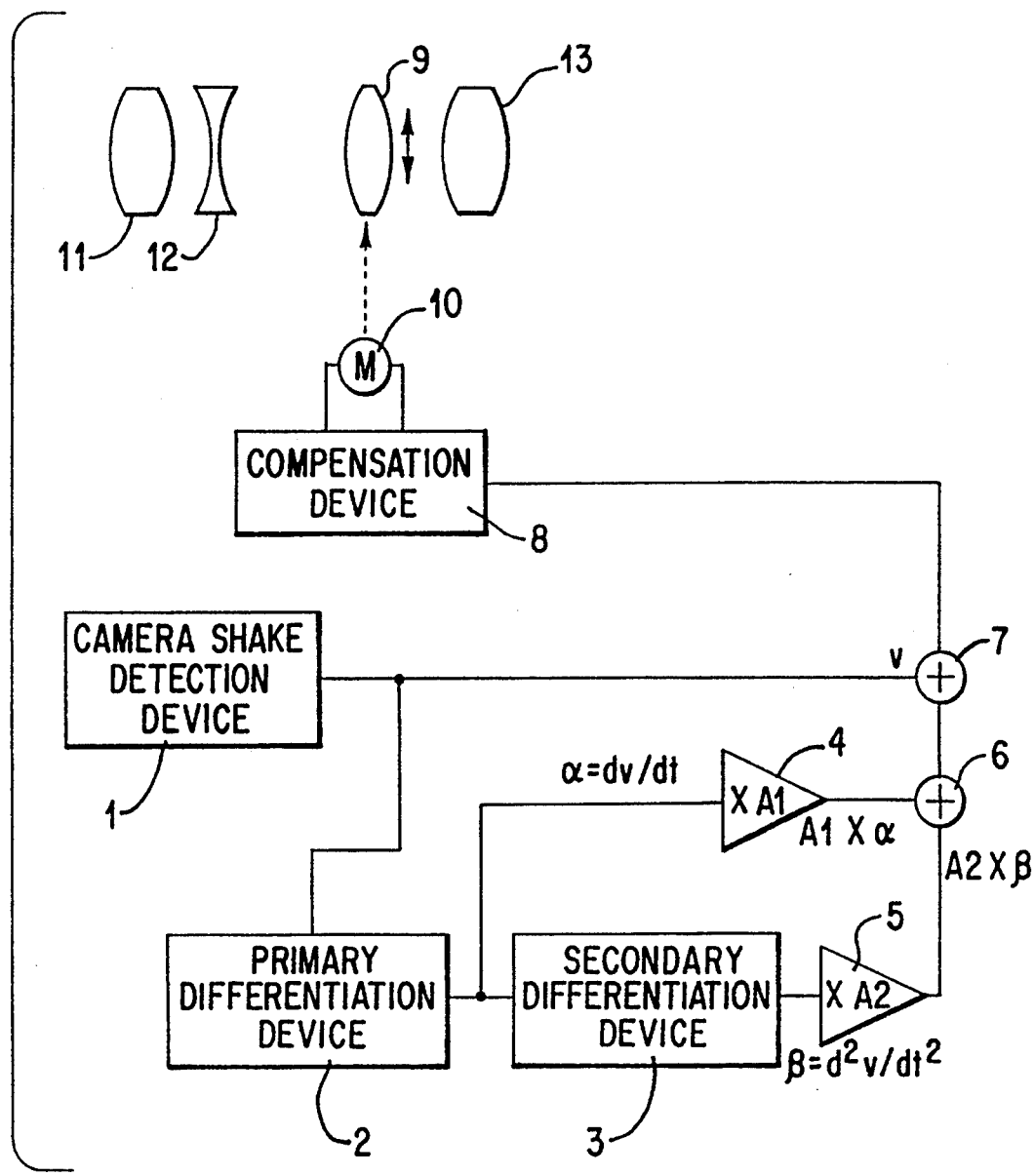
FIG. 1 is a schematic block diagram of an embodiment of the camera shake compensating camera according to the present invention.

FIG. 1 shows an actual embodiment of this invention. A camera shake compensating camera according to this invention comprises a camera shake detection device 1 that detects camera shake and a compensation device 8 that compensates for the camera shake based on the amount of camera shake detected by the camera shake detection device 1. The camera is also equipped with differentiation devices 2 and 3, which time-differentiate the amount of camera shake detected by camera shake detection device 1, and compensation determining devices, including elements 4, 5, 6 and 7 described below, which determine the amount of camera shake compensation. The compensation determining devices determine the amount of camera shake compensation based on the output of differentiation devices 2 and 3 and on a pre-established time delay. So, compensation device 8 compensates for the camera "shake" or oscillations based on the amount of camera shake compensation calculated by the compensation determining devices.

The camera is constructed so that the differentiation device includes a primary differentiation device 2, which time-differentiates the output of the camera shake detection device 1, and a secondary differentiation device 3, which time-differentiates the output of the primary differentiation device 2.

With the camera shake compensating camera (hereafter abbreviated as 'camera'), camera shake is negated by detecting camera shake in the x and y directions of the plane perpendicular to the camera's optical axis and moving the photographic lens in the x and y directions according to the amount of detected camera shake. It follows that it is necessary to detect camera shake separately in the x and y directions, but the following description is limited to detection of camera shake in the x direction only for purposes of simplicity.

FIG. 1 is a block diagram of an actual embodiment of the camera shake compensating camera according to this invention. Camera shake detection device 1 detects shake in the camera and outputs the camera shake v. Primary differentiation device 2 is a differentiation circuit that time-differentiates the amount of camera shake from camera shake detection device 1. The differentiated value is referred to in FIG. 1 as $\alpha$ (which equals $dv/dt$). Secondary differentiation device 3 is a differentiation circuit that differentiates the output $\alpha$ of the primary differentiation circuit 2. Its differentiated value is referred to in FIG. 2 as $\beta$ (which equals $d^2v/dt^2$).

The compensation determining devices include a first amplifying circuit 4, a second amplifying circuit 5, a first adding circuit 6, and a second adding circuit 7. Amplifying circuit 4 amplifies the output $\alpha$ of primary differentiation circuit 2 by A1 times. Thus, the output of amplifying circuit 4 is $A1 \times \alpha$. Amplifying circuit 5 amplifies the output $\beta$ of secondary differentiation circuit 3 by A2 times. Thus, the output of amplifying circuit 5 becomes $A2 \times \beta$. Adding circuit 6 adds the output of amplifying circuits 4 and 5. Adding circuit 7 adds the first adding circuit 6 and the amount of camera shake, which comprises the output v of the camera shake detection device 1. The total amount of camera shake compensation is output from adding circuit 7.

Compensation device 8 is a motor driving circuit that determines the amount of operation for motor 10 required to move a compensating lens 9 based on the output of the adding circuit 7 and regulates the operation of motor 10. The driving force of motor 10 reaches compensating lens 9 by a gear mechanism and causes compensating lens 9 to move only a fixed amount in the x direction. Lenses 11, 12, and 13 are each photographic lenses.

The operation of the camera shake compensating camera according to the present invention is described hereafter based on FIG. 1. Camera shake detection device 1 detects the actual amount of camera shake v0 in the camera through an angular velocity sensor by transforming oscillations to voltage and outputting the voltage value v. At this point there is a difference between the actual amount v0 of camera shake and the output v from camera shake detection device 1 because of the time required to detect the camera shake within the camera shake detection device and to transform it into a voltage value and output the value. Denoting this time delay as $t_s$, the output v from the camera shake detection device is expressed as a time-dependent function f(t), as follows:

$$v=f(t-t_s) \qquad \text{Equation 1}$$

Figure 2:
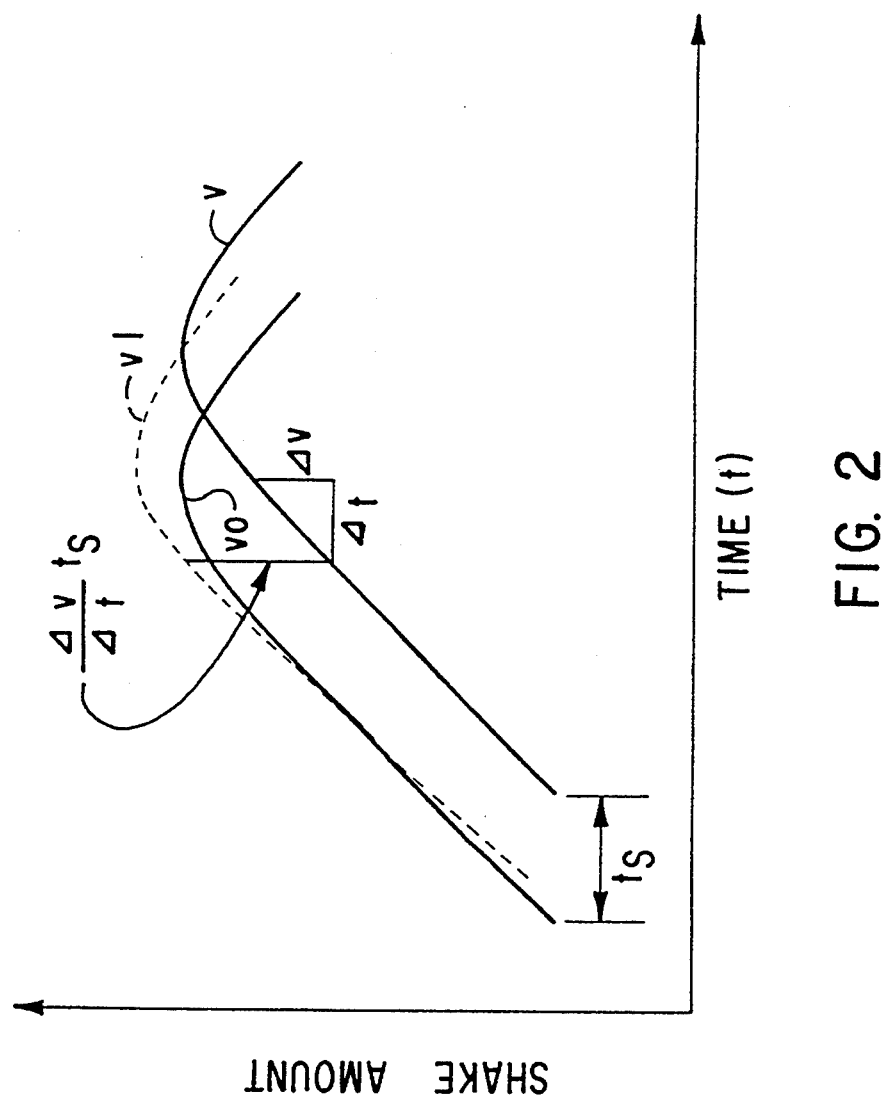
FIG. 2 is a wave diagram showing the relationship between the wave shape of the actual camera shake and the wave shape of the value detected by the camera shake detection circuit.

FIG. 2 is a diagram showing the wave shapes of the actual amount of camera shake v0 and of the output v from camera shake detection device 1. As shown in FIG. 2, the wave shape of the output v from camera shake detection device 1 lags the phase of the wave shape of the actual amount of camera shake v0 by the amount $t_s$.

It follows that correct camera shake compensation cannot be achieved by simply using the output v from the camera shake detection device in its existent state. Rather, it is necessary to adjust the output v from camera shake detection device 1 and to infer the actual amount of camera shake v0.

First, in equation 1, by adding v to the multiplied value of the altered amount of the v ($\Delta v/\Delta t$) of the nearest unit time and the time delay $t_s$ of camera shake detection device 1, v is adjusted. The v in this case is denoted as v1 and is expressed as follows:

$$v1=v+(\Delta v/\Delta t)^*t_s \qquad \text{Equation 2}$$

In the above expression, if $\Delta t$ is sufficiently small, equation 2 is as follows:

$$v1=v+(dv/dt)^*t_s \qquad \text{Equation 3}$$

In equation 3, letting $\alpha=dv/dt$, v1 is expressed as follows:

$$v1=v+\alpha^*t_s \qquad \text{Equation 4}$$

The wave shape of equation 4 is shown by the dashed line in FIG. 2. Its phase approaches that of the actual value of the camera shake v0, but it can be seen that the amplitude (amount of camera oscillation) is larger than v0. It follows that even if camera shake compensation is carried out according to equation 4, the compensation is somewhat different from the actual value of camera shake.

At this point, the amount of compensation needed for the actual amount of camera shake is examined through equation 4. We note here that the frequency band limits of actually occurring camera shake are known to be primarily on the order of 1 Hz to 10 Hz. Because camera shake, which is influenced largely by the time delay, is a high-frequency shake, the following descriptions will assume that a shake with a sine wave of 10 Hz has occurred, as shown in equation 5.

$$v0=A \sin (2\pi ft) \qquad \text{Equation 5}$$

provided that f=10 Hz and A is a constant.

At this point, the output v from camera shake detection device 1 takes the wave shape v, which lags v0 by the time $t_s$, as shown in equation 6.

$$v=A \sin \{2\pi f(t-t_s)\} \qquad \text{Equation 6}$$

Figure 3:
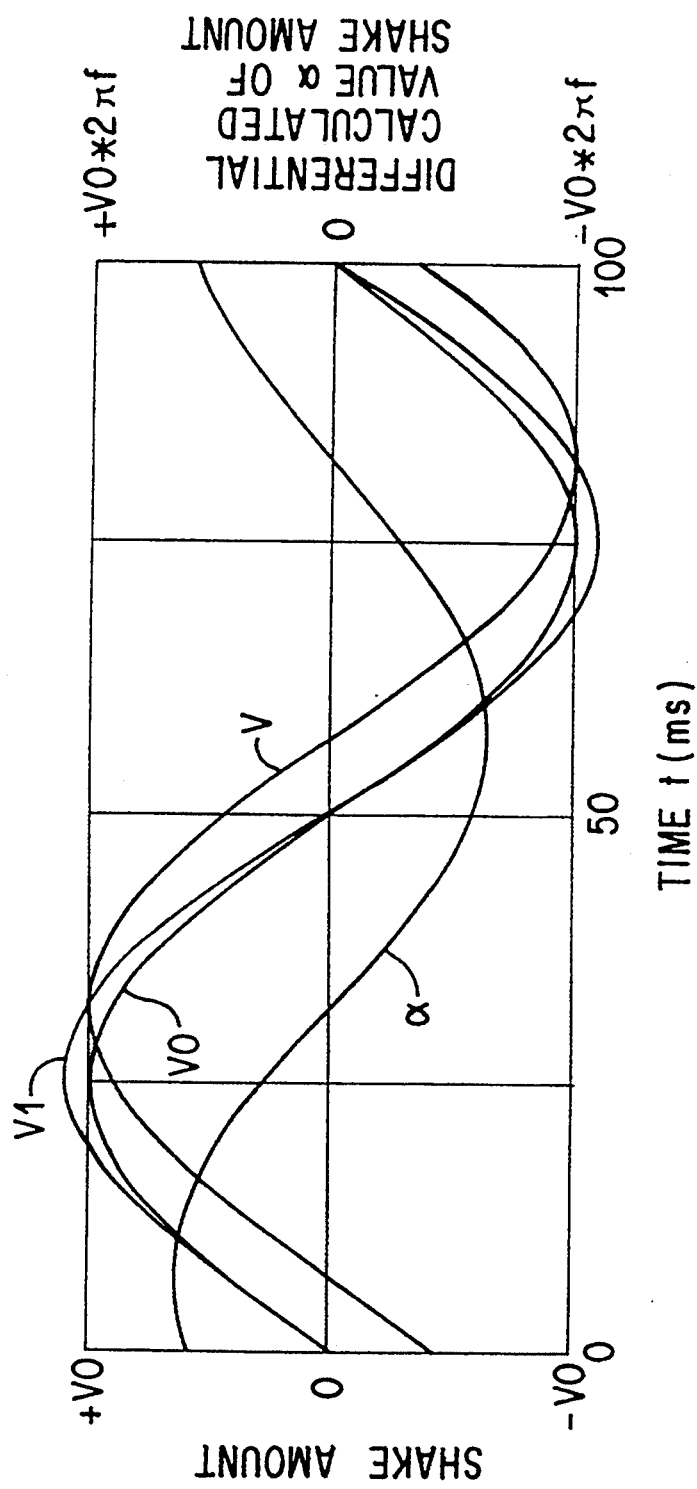
FIG. 3 is a wave diagram showing the relationship of v, v0, v1, and $\alpha$.

FIG. 3 shows the wave shape of the v0 expressed in equation 5, the wave shape of v expressed in equation 6, the wave shape of v1, which has been adjusted according to equation 4, and the wave shape of $\alpha=dv/dt$. It is assumed that the time delay $t_s$ that occurs within camera shake detection device 1 is 7 ms. The vertical scale for v, v0, and v1 is shown on the left side of FIG. 3, while the vertical scale for $\alpha$ is shown on the right side.

In FIG. 3, the phase of v lags v0 by the amount $t_s$. The lag time between v0 and v1 is small, but it can be seen that the amplitude of v1 is larger. The reason that the amplitude of v1 is larger than that of v in FIG. 3 is that the phase of the $\alpha=dv/dt$ wave lags v0 by the time delay $t_s$.

At this point, compensation is made for the time delay of $\alpha$. By adding $\alpha$ to the multiplied value of the altered amount ($\Delta\alpha/\Delta t$) of the $\alpha$ of the nearest unit time and the time delay $t_s$, similar to equation 2, the time delay of $\alpha$ is adjusted. Denoting the adjusted value of $\alpha$ in this case as $\alpha 1$ and assuming that t is sufficiently small, $\alpha 1$ is expressed as follows:

$$\alpha 1 = \alpha + (\Delta\alpha/\Delta t)^* t_s = dv/dt + d^2v/dt^2 {}^* t_s \qquad \text{Equation 7}$$

Letting $\beta = d^2v/dt^2$ in equation 7, $\alpha 1$ may be expressed as follows:

$$\alpha 1 = \alpha + \beta^* t_s \qquad \text{Equation 8}$$

Substituting the $\alpha 1$ of the above equation for the $\alpha$ of equation 4 and denoting the calculated value as v2, v2 may be expressed as follows:

$$v2 = v + (\alpha + \beta^* t_s)^* t_s \qquad \text{Equation 9}$$

Figure 4:
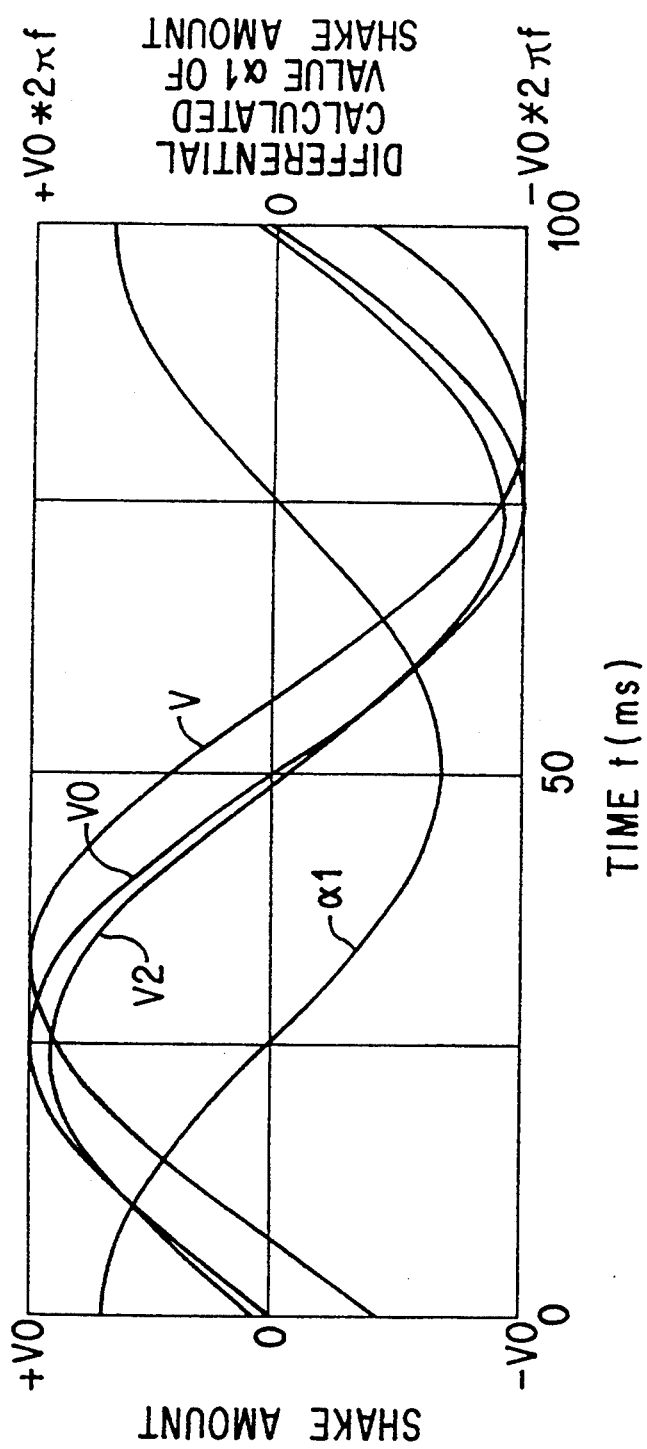
FIG. 4 is a wave diagram showing the relationship of v, v0, v2, and $\alpha 1$.

FIG. 4 shows the actual amount of camera shake v0, the output value v1 of camera shake detection device 1, the wave shape of the adjusted value of v1 (v2), and the wave shapes of the v expressed in equation 6 and of the $\alpha 1$ expressed in equation 7. It is assumed that the time delay $t_s$ that occurs within the camera shake detection device is 7 ms. The vertical scale for v, v0, and v2 is shown on the left side of FIG. 4, while that for $\alpha 1$ is shown on the right side.

It can be seen in FIG. 4 that the amplitude of v2 is smaller than that of v0. This is due to the fact that v2 is calculated according to equation 9, using $\alpha 1$, the phase of which is earlier than that of $\alpha$. In other words, it is because the phase of $\alpha 1$ is much earlier than that of $\alpha$. Comparing FIGS. 3 and 4, it can be seen that a camera shake compensating wave shape with the same amplitude and phase as that of the actual value of the camera shake v0 can be obtained by taking the phase value halfway between $\alpha$ and $\alpha 1$ as the adjusted value of $\alpha$.

At this point, the value of $t_s$ in equation 8 is divided in half, and the time delay of $\alpha$ is adjusted. Denoting the adjusted value in this case as $\alpha 2$, it becomes:

$$\alpha 2 = \alpha + \beta^* (t_s/2) \qquad \text{Equation 10}$$

Substituting equation 10 for equation 4 and denoting the adjusted value of the amount of camera shake v as v3, it becomes:

$$v3 = v + (\alpha + \beta^* (t_s/2))^* t_s$$

Figure 5:
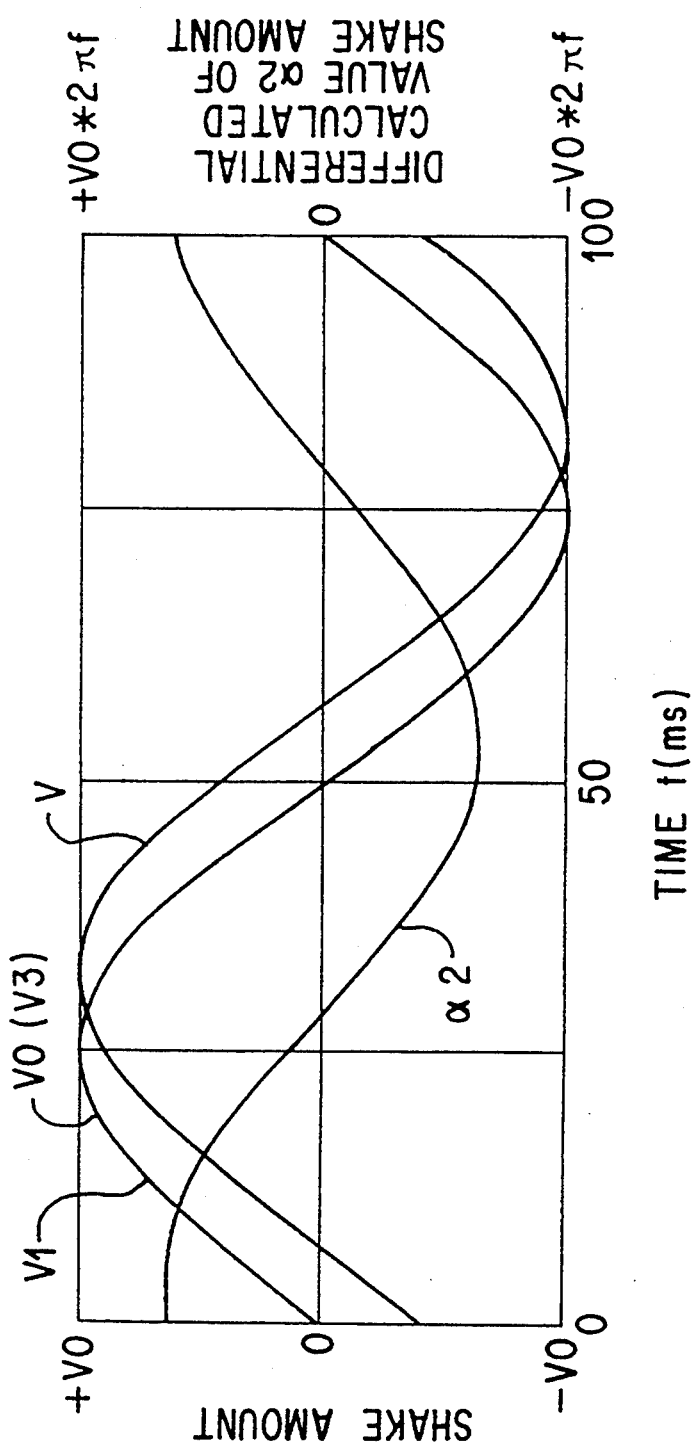
FIG. 5 is a wave diagram showing the relationship of v, v0, v1, v3, and $\alpha 2$.

FIG. 5 shows the wave shapes of the actual amount of camera shake v0, the output value v1 of camera shake detection device 1, the adjusted value v3 of v1 according to equation 11, and of the $\alpha 2$ expressed in equation 10. It is assumed that $t_s = 7$ ms. The vertical scale for v, v0, v1, and v3 is shown on the left side of FIG. 5, while the vertical scale of $\alpha 2$ is shown on the right.

It can be seen in FIG. 5 that the wave shape of v3 is virtually equivalent to that of v0. Thus, if the output v1 of camera shake detection device 1 is adjusted according to equation 11, it can be seen that the actual amount of the camera shake v0 may be reproduced.

At this point, the output v1 of the camera shake detection device 1 is input into primary differentiation circuit 2, v1 is time-differentiated, and the value of $\alpha$ is calculated according to $\alpha = dv/dt$. The calculated result of $\alpha$ is then input into the secondary differentiation circuit 3 and into first amplifying circuit 4. Secondary differentiation circuit 3 time-differentiates $\alpha$ and outputs $\beta = d^2v/dt^2$, and first amplifying circuit amplifies $\alpha$ by A1 ($=t^s$) times. The output $\beta$ of secondary differentiation circuit 3 is input into second amplifying circuit 5, and $\beta$ is amplified by A2 ($=t_s2/2$) times. First adding circuit 6 adds the outputs of amplifying circuits 4 and 5 and outputs $\alpha^* t_s + \beta^* t_s 2/2$. Second adding circuit 7 adds the output of camera shake detection device 1 and the output of first adding circuit 6 and, from this data, computes the ultimate amount of camera shake compensation by $v3 = v + (\alpha + \beta^* t_s/2)$. Motor driving circuit 8 drives motor 10 based on the amount of camera shake compensation v3 from adding circuit 7. The motion of the motor is transformed into linear motion by a gear, and compensating lens 9 is moved in the x direction.

In this manner, in the actual example described above, even though it requires time to detect camera shake using camera shake detection device 1, the actual amount of camera shake can be accurately reproduced. Thus, the accuracy of the camera shake compensation is improved because the time is considered in compensating for the amount of camera shake.

In the actual example described above, the output value of the camera shake detection device is adjusted according to the time delay from the time the camera shake actually occurs to the time the amount of camera shake is output by camera shake detection device 1. However, there are actually other occurring time delays which exist. Possible causes of these additional time delays include:

the time required while the driving amount is calculated by motor driving circuit 8, according to the output v3 of adding circuit 7;

the time required until motor 10 actually moves;

the time required until the rotation of motor 10 stabilizes; and the time required until the driving force of motor 10 reaches compensating lens 9 through the gear.

If all of these time delays are considered, with their sum total denoted as $t_s$ and the camera shake compensation amount calculated according to equation 11, an even more accurate camera shake compensation is possible.

Further, the time delay $t_s$ can be calculated in advance through various experimentation.

The embodiment described above was described using only f = 10 Hz as the camera shake frequency (f). However, as noted, the frequencies that occur in camera shake are generally thought of as being in the range of 1–10 Hz. It is therefore acceptable to determine the amount to drive the motor based on the compounded results of several frequencies within the 1–10 Hz range, calculating the amount of camera shake compensation for each according to equation 11.

In the above description, the time delay $t_s$, which occurs in the various components of the camera shake compensating camera, was treated as a fixed value independent of the camera shake frequency. However, there are time delays among those occurring throughout the camera whose time delay amounts are dependent upon the camera shake frequency. It is therefore acceptable to consider the frequency distribution of the camera shake frequency developed in the camera, the characteristics of the detected frequency of camera shake detection device 1, the characteristics of motor 10, and the characteristics of the mechanism that drives compensating lens 9 when determining the effect (A1, A2) of each amplifying circuit 4 and 5. For example, the effect (A1, A2) of amplifying circuits 4 and 5 may be changed for each different camera shake frequency.

Also, in this embodiment, the calculating and adding of the differentiated amounts $\alpha$ and $\beta$ is carried out by hardware, but it is acceptable to perform these calculations with software using the CPU. For example, the output of the camera shake detection device may be transformed into a digital signal by an A/D transformer, an approximate value of $\alpha$ may be calculated from the altered amount of the fixed-interval v, an approximate value of $\beta$ may be calculated from the altered amount of the fixed-interval $\alpha$, and the calculations of equation 11 may be carried out within the CPU based on the calculated $\alpha$ and $\beta$. In this case, even if the effects (A1, A2) of amplifying circuits 4 and 5 are changed for each differing frequency, the CPU can easily carry out the calculations according to equation 11 by forming a table in the memory that shows the relationship between the frequency and the effect. It can then economically carry out the same operations as the described embodiment by transforming the calculated result into an analog signal through a D/A transformer and sending it to motor driving circuit 8.

The actual example described above was described assuming that the camera shake occurred only in one direction (the x direction) in the plane perpendicular to the optical axis, but camera shake in the y direction can also be compensated for by installing circuits similar to those in FIG. 1.

Furthermore, in addition to the angular velocity sensor used in the camera shake detection device in the described embodiment, a variety of other camera shake detection devices may be used. These devices include devices that store images of the object being photographed at fixed intervals through linear sensors or image sensors using CCD's, detecting the periodic shake of the results of each resultant image, and compensating for the camera shake.

Moreover, the compensation amount in the actual example described above is calculated by a 2-step differentiation of the output v of camera shake detection device 1, but this amount may also be calculated by a differentiation of 3 stages or more. Even more accurate camera shake compensation amounts can be calculated by increasing the number of differentiations.

Figure 6:
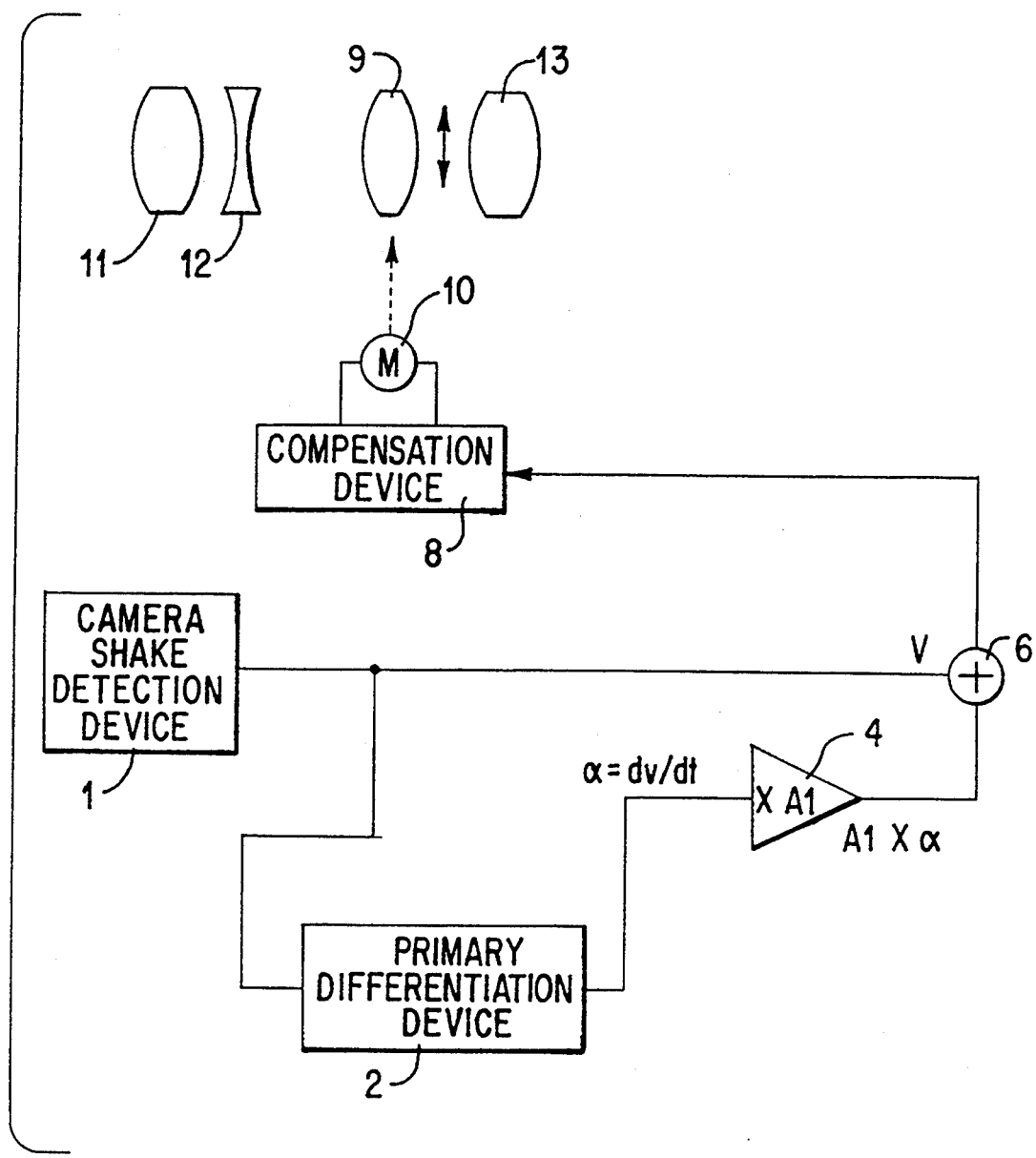
FIG. 6 is a block diagram showing an alternate embodiment of the camera shake compensating camera according to the present invention.

Conversely, it is also acceptable to forego the 2-step differentiation and compensate using only a single differentiation, according to equation 4. In this case, the actual example takes the form shown in the block diagram shown in FIG. 6. In that case, in comparison to the block diagram of FIG. 1, second differentiation circuit 3, second amplifying circuit 5, and adding circuit 6 are unnecessary. By eliminating these circuits, the circuit that carries out the camera shake compensation is simplified, and a more economical camera shake compensation can be accomplished. Also, by simplifying the circuit, the time required until the compensation is actually made is shortened.

The actual example described above utilizes a compensating lens 9 as the camera shake compensating component. Its optical axis shifts in relation to the optical axes of the photographic lenses 11, 12 and 13. However, the camera shake compensating component is not limited to a compensating lens 9. This invention may also be applied to cases in which reflecting mirrors and/or variable angle prisms are used to carry out the camera shake compensation.

As described in detail above, this invention provides highly accurate camera shake compensation, which corresponds to the actual amount of camera shake without being influenced by the time delay occurring from the time the camera shake actually occurs until the time the shake is detected and the compensating lens is moved. This is because it differentiates between the result of the detected camera shake, multiplies the differentiated value by a previously established time delay, and calculates the amount of camera shake compensation based upon the multiplication result and the result of the detected camera shake. Further, since a 2-step differentiation is accomplished on the basis of the results of the detected camera shake to calculate the amount of camera shake compensation, it is possible to achieve a more accurate compensation, corresponding to the actual amount of camera shake, by using a simple calculation process.

While advantageous embodiments have been chosen to illustrate the invention, it will be understood by those skilled in the art that various changes and modifications can be made therein without departing from the scope of the invention as defined in the appended claims.

What is claimed is:

1. A camera shake compensating camera comprising:
   a camera shake detection mechanism that detects an amount of camera shake at a first time, which is when the camera shake occurs, and outputs a camera shake amount at a second time wherein the difference between the first time and the second time defines a delay time between when the camera shake occurs and when the detected camera shake is output;
   a differentiation mechanism that time-differentiates the detected amount of camera shake and outputs an adjusted amount of camera shake, wherein the differentiation mechanism comprises a primary differentiator that time-differentiates the amount of camera shake output from the camera shake detection mechanism and outputs a first differentiated amount, and a secondary differentiation mechanism that time-differentiates the output of the primary differentiation mechanism and outputs a second differentiated amount;
   a compensation determining mechanism that determines a compensation amount for the detected camera shake amount based on the adjusted amount of camera shake and the time delay; and
   a compensation mechanism that compensates for the amount of camera shake based upon the determined compensation amount that accommodates the delay time.

2. The camera shake compensating camera of claim 1 wherein the compensation determining mechanism comprises a first amplifier that amplifies the first differentiated amount based on the time delay in the camera shake detection mechanism, and a second amplifier that amplifies the second differentiated amount based on the time delay in the camera shake detection mechanism.

3. The camera shake compensating camera of claim 2 wherein the compensation determining mechanism comprises an adding circuit for adding the first and second amplified amounts from the differentiation mechanism.

4. A camera shake compensating camera comprising:
a camera shake detection mechanism that detects an amount of camera shake at a first time, which is when the camera shake occurs, and outputs a camera shake amount at a second time wherein the difference between the first time and the second time defines a delay time between when the camera shake occurs and when the detected camera shake is output;
a differentiation mechanism that time-differentiates the detected amount of camera shake and outputs an adjusted amount of camera shake;
a compensation determining mechanism that determines a compensation amount for the detected camera shake amount based on the adjusted amount of camera shake and the time delay; and
a compensation mechanism that compensates for the amount of camera shake based on the determined compensation amount that accommodates the delay time.

5. The camera shake compensating camera of claim 4 wherein the camera shake detecting mechanism comprises an angular velocity sensor.

6. The camera shake compensating camera of claim 4 wherein the compensation mechanism comprises a motor driving circuit, a motor controlled by the motor driving circuit and a compensating lens driven by the motor.

7. The camera shake compensating camera of claim 4 wherein the compensation determining mechanism comprises an amplifier that amplifies the adjusted amount of camera shake based on the time delay in the camera shake detection mechanism.

8. The camera shake compensating camera of claim 4 wherein the compensation determining mechanism comprises an amplifying mechanism that amplifies the differentiated amount of camera shake based on the time delay in the camera shake detection mechanism.

9. The camera shake compensating camera of claim 8 wherein the compensation determining mechanism comprises an adding circuit for adding the amount of camera shake output from the camera shake detecting mechanism and the amplified amount from the differentiation mechanism.

10. The camera shake compensating camera of claim 4 wherein the camera shake detecting mechanism transforms detected oscillations into an electrical signal and outputs the amount of camera shake as the electrical signal.

11. The camera shake compensating camera of claim 10 wherein the differentiation mechanism comprises a time-differentiation circuit.

12. A method of compensating for shake in a camera, comprising the steps of:
detecting a shake amount with a camera shake detection device and outputting an initial shake value;
time-differentiating the initial shake value and outputting a first adjusted shake value;
amplifying the first adjusted shake value and outputting a first amplified value;
adding the initial shake value and the first amplified value and computing a compensation amount based on the addition; and
driving a compensation device based on the compensation amount to compensate for the camera shake.

13. The method of claim 12 wherein the step of detecting a shake amount with a camera shake detection device includes transforming oscillations into voltage, and outputting an initial shake value includes outputting a voltage.

14. The method of claim 12 wherein the step of amplifying the first adjusted shake value includes multiplying the first adjusted shake value based on a time delay between when the camera shake occurs and when the initial shake value is output.

15. The method of claim 12 wherein the step of driving a compensation device based on the compensation amount to compensate for the camera shake includes outputting the compensation amount as an electrical signal and driving a motor based the output electrical signal.

16. The method of claim 15 wherein the step of driving a compensation device includes transforming the driving motion of the motor into linear motion to compensate for the camera shake.

17. The method of claim 12 further comprising the steps of
time-differentiating the first adjusted shake value and outputting a second adjusted shake value;
amplifying the second adjusted shake value and outputting a second amplified value; and
wherein the step of adding the initial shake value and the first amplified value also includes adding the second amplified value and then computing a compensation amount based on the addition.

18. The method of claim 17 wherein the step of amplifying the second adjusted shake value includes multiplying the second adjusted shake value based on one-half of a time delay in the camera shake detection device between when the camera shake occurs and when the initial shake value is output.

19. A camera shake compensating camera comprising:
detecting means for detecting an amount of camera shake and outputting an initial shake value;
time-differentiating means for time-differentiating the initial shake and outputting a time-differentiated value;
compensation determining means for determining a compensation amount based on the initial shake value, the time-differentiated value, and a time delay between a time that the camera shake occurs and a time that the detecting means outputs the initial shake value; and
compensation means for compensating the camera shake based on the compensation amount.

20. The camera shake compensating camera of claim 19 wherein the compensation determining means comprises an adding circuit for adding the amount of camera shake output from the camera shake detecting mechanism and the amplified amount from the differentiation means.

21. The camera shake compensating camera of claim 19 wherein the camera shake detection mechanism comprises an angular velocity sensor.

22. The camera shake compensating camera of claim 19 wherein the compensation means comprises a motor driving circuit, a motor controlled by the motor driving circuit and a compensating lens driven by the motor.

23. The camera shake compensating camera of claim 19 wherein the compensation determining means comprises an amplifying means for amplifying the adjusted amount of camera shake based on the time delay in the camera shake detection mechanism.

24. The camera shake compensating camera of claim 19 wherein the camera shake detecting mechanism transforms detected oscillations into an electrical signal and outputs the amount of camera shake as the electrical signal.

25. The camera shake compensating camera of claim 24 wherein the differentiation means comprises a time-differentiation circuit.

26. A camera shake compensating camera comprising:
   detecting means for detecting an amount of camera shake and outputting an initial shake value;
   time-differentiating means for time-differentiating the initial shake value and outputting a time-differentiated value;
   amplifying means for amplifying the time-differentiated value based on a time delay between a time that the camera shake occurs and a time that the detecting means is output and outputting an amplified value;
   compensation determining means for determining a compensation amount based on the initial shake value and the amplified value; and
   compensation means for compensating the camera shake based on the compensation amount.

27. A camera shake compensating camera comprising:
   detecting means for detecting an amount of camera shake and outputting an initial shake value;
   time-differentiating means for time-differentiating the initial shake value and outputting a time-differentiated value;
   amplifying means for amplifying the time-differentiated value based on a time delay between a time that the camera shake occurs and a time that the detecting means outputs the initial shake value and outputting an amplified value;
   adding means for adding the initial shake value and the amplified value; and
   compensation means for compensating the camera shake based on the output of the adding means.

28. A camera shake compensating camera comprising:
   detecting means for detecting an amount of camera shake and outputting an initial shake value;
   first time-differentiating means for time-differentiating the initial shake value and outputting a first time-differentiated value;
   second time-differentiating means for time-differentiating the first time-differentiated value and outputting a second time-differentiated value;
   compensation means for determining a compensation amount based on the initial shake value, the first differentiated value, the second differentiated value, and a time delay between a time that the camera shake occurs and a time that the detecting means outputs the initial shake value; and
   compensation means for compensating the camera shake based on the compensation amount.

29. The camera shake compensating camera of claim 28 wherein the differentiation means comprises a primary differentiation circuit and a secondary differentiation circuit.

30. A camera shake compensating camera comprising:
   detecting means for detecting an amount of camera shake and outputting an initial shake value;
   first time-differentiating means for amplifying time-differentiating the initial shake value and outputting a first time-differentiated value;
   second time-differentiating means for amplifying time-differentiating the first time-differentiated value and outputting a second time-differentiated value;
   first amplifying means for amplifying the first time-differentiated value based on a time delay between a time that the camera shake occurs and a time that the detecting means outputs the initial shake value and outputting a first amplified value;
   second amplifying means for amplifying the second time-differentiated value based on a time delay between a time that the camera shake occurs and a time that the detecting means outputs the initial shake value and outputting a second amplified value;
   compensation determining means for determining a compensation amount based on the initial shake value, the first amplified value, and the second amplified value; and
   compensation means for compensating the camera shake based on the compensation amount.

31. A camera shake compensating camera comprising:
   detecting means for detecting an amount of camera shake and outputting an initial shake value;
   first time-differentiating means for time-differentiating the initial shake value and outputting a first time-differentiated value;
   second time-differentiating means for time-differentiating the first time-differentiated value and outputting a second time-differentiated value;
   first amplifying means for amplifying the first time-differentiated value based on a time delay between a time that the camera shake occurs and a time that the detecting means outputs the initial shake value and outputting a first amplified value;
   second amplifying means for amplifying the second time-differentiated value based on a time delay between a time that the camera shake occurs and a time that the detecting means outputs the initial shake value and outputting a second amplified value;
   first adding means for adding the first amplified value and the second amplified value;
   second adding means for adding the initial shake value and the output of first adding means; and
   compensation means for compensating the camera shake based on the output of the second adding means.

* * * * *